US008695718B2

(12) United States Patent
Sanders et al.

(10) Patent No.: US 8,695,718 B2
(45) Date of Patent: Apr. 15, 2014

(54) DISPERSION COMPOSITIONS WITH NONIONIC SURFACTANTS FOR USE IN PETROLEUM RECOVERY

(75) Inventors: Aaron W. Sanders, Missouri City, TX (US); Keith P. Johnston, Austin, TX (US); Quoc Nguyen, Austin, TX (US); Stephanie Adkins, Austin, TX (US); Xi Chen, Austin, TX (US); Ed G. Rightor, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 262 days.

(21) Appl. No.: 13/382,166

(22) PCT Filed: Aug. 19, 2009

(86) PCT No.: PCT/US2009/004724
§ 371 (c)(1),
(2), (4) Date: Jan. 4, 2012

(87) PCT Pub. No.: WO2011/005246
PCT Pub. Date: Jan. 13, 2011

(65) Prior Publication Data
US 2012/0103635 A1 May 3, 2012

Related U.S. Application Data (60) Provisional application No. 61/270,409, filed on Jul. 7, 2009.

(51) Int. Cl.
*E21B 43/22* (2006.01)
(52) U.S. Cl.
USPC .............. 166/403; 166/270.1; 166/272.6; 166/304

(58) Field of Classification Search
None
See application file for complete search history.

(56) References Cited

U.S. PATENT DOCUMENTS

| | | | |
|---|---|---|---|
| 2,623,596 A | 12/1952 | Whorton et al. |
| 2,866,507 A | 12/1958 | Bond et al. |
| 2,932,616 A | 4/1960 | Blake |
| 3,065,790 A | 11/1962 | Holm |
| 3,330,346 A | 7/1967 | Jacobs et al. |
| 3,529,668 A | 9/1970 | Bernard |
| 4,113,011 A | 9/1978 | Bernard et al. |
| 4,203,491 A | 5/1980 | Reisberg |
| 4,380,266 A | 4/1983 | Wellington |
| 4,448,697 A | 5/1984 | McCoy et al. |
| 4,502,538 A | 3/1985 | Wellington et al. |
| 4,703,797 A | 11/1987 | Djabbarah |

(Continued)

FOREIGN PATENT DOCUMENTS

| | | |
|---|---|---|
| JP | 3258740 | 11/1991 |
| WO | 2008134390 | 11/2008 |

OTHER PUBLICATIONS

International Preliminary Report on Patentability from related PCT application PCT/US2009/004724 dated Jan. 19, 2012, 8 pages.

(Continued)

*Primary Examiner* — Zakiya W Bates
(74) *Attorney, Agent, or Firm* — Brooks, Cameron & Huebsch, PLLC (57) ABSTRACT

Embodiments of the present disclosure include dispersion compositions having a nonionic surfactant for use in enhanced petroleum recovery, and methods of using the dispersion compositions in petroleum recovery processes. For the various embodiments, the nonionic surfactant of the dispersion composition promotes the formation of a dispersion from carbon dioxide and water.

8 Claims, 1 Drawing Sheet

(56) References Cited

U.S. PATENT DOCUMENTS

| | | |
|---|---|---|
| 4,739,831 A | 4/1988 | Settlemeyer et al. |
| 4,828,029 A | 5/1989 | Irani |
| 4,856,589 A | 8/1989 | Kuhlman et al. |
| 5,033,547 A | 7/1991 | Schievelbein |
| 5,279,367 A | 1/1994 | Osterloh |
| 5,333,687 A | 8/1994 | Osterloh |
| 5,363,915 A | 11/1994 | Marquis et al. |

OTHER PUBLICATIONS

Dickson, et al., "Stabilization of Carbon Dioxide-in-Water Emulsions with Silica Nanoparticles", Langmuir, vol. 20, No. 19, American Chemical Society, 2004, pp. 7976-7983.

Zhu, et al., "Improving the Foam Performance for Mobility Control and Improved Sweep Efficiency in Gas Flooding", Ind. Eng. Chem. Res., vol. 43, No. 15, American Chemical Society, 2004, pp. 4413-4421.

Da Rocha, et al., "Concentrated CO2-in-Water Emulsions with Nonionic Polymeric Surfactants", Journal of Colloid and Interface Science, No. 239, 2001, pp. 241-253.

Liu, et al., "CO2 Foam Behavior: Influence of Temperature, Pressure, and Concentration of Surfactant", Society of Petroleum Engineers, No. 94307, 2005, pp. 1-13.

Syahputra, et al., "Laboratory Evaluation of Using Lignosulfonate and Surfactant Mixture in CO2 Flooding", Society of Petroleum Engineers, No. 59368, 2000, pp. 1-9.

Chou, et al., "CO2,Foam Field Trial at North Ward-Estes", Society of Petroleum Engineers, No. 24643, 1992, pp. 129-140.

Borchardt, et al., "Surfactants for CO2 Foam Flooding", Society of Petroleum Engineers, No. 14394, 1985, pp. 1-12.

Gautun, et al., "Selective Synthesis of Aliphatic Ethylene Glycol Sulfonate Surfactants", Acta Chemica Scandivica, No. 50, 1996, pp. 170-177.

Guo, et al., "Calculation of hydrophile-lipophile balance for polyethoxylated surfactants by group contribution method", Journal of Colloid and Interface Science, vol. 298, No. 1, Jun. 2006, pp. 441-450.

Prokop, et al., "A study of captive bubbles with axisymmetric drop shape analysis", Colloids and Surfaces A: Physiochemical and Engineering Aspects, vol. 131, Issues 1-3, Jan. 1, 1998, pp. 231-247.

International Search Report and Written Opinion from related PCT application PCT/US2009/004724 dated Oct. 3, 2010, 13 pages.

DISPERSION COMPOSITIONS WITH NONIONIC SURFACTANTS FOR USE IN PETROLEUM RECOVERY

This application is a National Stage application under 35 U.S.C. 371 of PCT/US2009/004724, filed on Aug. 19, 2009 and published as WO 2011/005246 A1 on Jan. 13, 2011, which claims the benefit of U.S. Provisional Application Ser. No. 61/270,409 filed Jul. 7, 2009, the entire contents of which are incorporated herein by reference in its entirety.

FIELD OF DISCLOSURE

Embodiments of the present disclosure are directed toward petroleum recovery; more specifically, embodiments are directed toward dispersion compositions that include a nonionic surfactant for use in enhanced petroleum recovery and methods of using the dispersion compositions in petroleum recovery processes.

BACKGROUND

A variety of techniques have been used to enhance the recovery of petroleum from subterranean formations in which the petroleum no longer flows by natural forces. Such techniques can include water injection and/or subsequent gas flooding, among others. Water injection can be useful to recover some petroleum, however, only about a third of the petroleum are recovered using this technique. As such, typically water injection procedures are followed by gas flooding procedures. Gas flooding can be performed with a miscible gas, to reduce the viscosity of the petroleum present in the subterranean formation in order to increase the flow of petroleum to a production well. Carbon dioxide, which acts as a solvent to reduce the viscosity of the petroleum, is one of the most effective, and least expensive, miscible gases.

Gas flooding, however, can be accompanied with a number of drawbacks. One main problem encountered is poor sweep of the subterranean formation. Poor sweep occurs when the gas injected into the subterranean formation during a gas flooding process flows through the paths of least resistance due to the low viscosity of the gas, thus bypassing significant portions of the formation. This issue of poor sweep can further be compounded if the mobility ratio (i.e., the ratio of relative permeability to viscosity) between the petroleum and the injected gas is high. When the mobility ratio is high or low (e.g., out of balance) the less viscous material tends to finger through the viscous one, which further limits recovery of the petroleum.

When the injected gas bypasses significant portions of the formation and/or fingers through the petroleum due to a poor mobility, less of the petroleum is contacted with the gas, reducing the likelihood that the gas will reduce the viscosity of the petroleum. Thus, the gas injected during the gas flooding process is meant to "sweep" the petroleum toward the production well by lowering the viscosity of the petroleum. However, when the gas does not contact a large portion of the petroleum contained in the subterranean formation, a large portion of the petroleum in the subterranean formation is left behind, producing poor sweep. In addition, due to the low density of the gas, the injected gas can rise to the top of the formation and "override" portions of the formation. This can then lead to early breakthrough of the gas at the production well and increased production costs associated with and surface handling and cycling of the gas.

To enhance the gas flooding process effectiveness, it has been suggested that the overall efficiency of a gas flooding process can be improved by including a foaming agent or surfactant to generate a dispersion in the formation. A dispersion can generate an apparent viscosity of about 100 to about 1,000 times that of the injected gas improving the mobility ratio. As such, the dispersion can force the gas to drive the recoverable hydrocarbons from the less depleted portions of the reservoir toward the production well. Further, the dispersion can inhibit the flow of the gas into that portion of the subterranean formation that has previously been swept. In other words, the dispersion can serve to block the volume of the subterranean formation through which the gas can short-cut, thereby reducing its tendency to channel through highly permeable fissures, cracks, or strata, and directing it toward previously unswept portions of the subterranean formation. This can also increase the recovery of hydrocarbons from the formation.

The surfactants used in gas flooding processes, however, have suffered from a number of drawbacks. For example, traditional surfactants, such as ethoxy-sulfates, tend to create unstable dispersions in the subterranean formation. An unstable dispersion can break and/or dissolve in the subterranean formation, allowing the gas from the gas flooding process to flow into the paths of least resistance, leading to early breakthrough and poor sweep, as discussed herein.

Another problem encountered by prior art surfactants has been the selection of anionic surfactants that have a high affinity to formation rock within the reservoir, for example, carbonate. Surfactants with a high affinity to formation rock can adsorb into the formation rock, leading to surfactant loss. Without the surfactant present, there is less likelihood of forming dispersion within the reservoir, also leading to early breakthrough and poor sweep, as discussed herein.

SUMMARY

Embodiments of the present disclosure include dispersion compositions having a nonionic surfactant for use in enhanced petroleum recovery, and methods of using the dispersion compositions in petroleum recovery processes. For the various embodiments, the nonionic surfactant of the dispersion composition promotes the formation of a dispersion from carbon dioxide and water.

Embodiments of the present disclosure include, but are not limited to, a nonionic surfactant for use in forming a dispersion composition with carbon dioxide and water, and a method for recovering petroleum from a subterranean formation that is penetrated by at least one injection well and one production well, which includes injecting the dispersion composition of carbon dioxide and water in the subterranean formation with the nonionic surfactant of the Formula:

where $R^1$ and $R^3$ or $R^1$ and $R^2$ are each independently a linear, a branched, a cyclic or an acyclic aliphatic group having 4 to 18 carbon atoms, with a remaining one of $R^1$, $R^2$ or $R^3$ being —$(R^4O)_y$—H, where $R^4$ is an aliphatic group having 2 to 4 carbon atoms and y is an integer from 9 to 40 inclusive; and recovering petroleum from the subterranean formation from a production well.

For the various embodiments, injecting the dispersion composition can include injecting the nonionic surfactant with water into the subterranean formation via the injection well. For the various embodiments, the carbon dioxide can be injected into the subterranean formation after injecting the nonionic surfactant with water into the subterranean formation.

For the various embodiments, the dispersion composition that includes carbon dioxide, water and the nonionic surfactant provided herein can be used in a subterranean formation for enhanced petroleum recovery. For the various embodiments, the nonionic surfactant of the dispersion composition helps to promote a formation of the dispersion composition formed of carbon dioxide and water.

For the various embodiments, a sum of carbon atoms in $R^1+R^3$ or $R^1+R^2$ can be 10 to 28. In an additional embodiment, the sum of carbon atoms in $R^1+R^3$ or $R^1+R^2$ can be 12 to 24. In one embodiment, the sum of carbon atoms in $R^1+R^3$ or $R^1+R^2$ is 16. For the various embodiments, the aliphatic group of $R^1$ and $R^3$ or $R^1$ and $R^2$ can each be of a different length. For the various embodiments, y can be an integer from 9 to 20 inclusive. For the various embodiments, $R^4$ can be a linear alkyl group 2 carbon atoms.

For the various embodiments, the nonionic surfactant can have the Formula:

where y is an integer from 9 to 20 inclusive.

For the various embodiments, the method can include allowing the carbon dioxide in the dispersion composition to dissolve into the petroleum in the subterranean formation to provide a lowered viscosity of the petroleum; and recovering the petroleum having the lowered viscosity from the subterranean formation. For the various embodiments, the method can also include injecting a drive fluid into the subterranean formation after injection the dispersion composition of carbon dioxide and water in the subterranean formation.

For the various embodiments, the dispersion composition can include a volume of carbon dioxide from 60 volume percent (vol. %) to 97 vol. % based on a total volume of the water and carbon dioxide. For the various embodiments, the dispersion composition can include a volume of the nonionic surfactant from 0.001 vol. % to 5 vol. % based on a total volume of the dispersion composition.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DEFINITIONS

As used herein, "a," "an," "the," "at least one," and "one or more" are used interchangeably. The terms "comprises," "includes" and variations of these words do not have a limiting meaning where these terms appear in the description and claims. Thus, for example, a dispersion composition that comprises "a" nonionic surfactant can be interpreted to mean a dispersion composition that includes "one or more" nonionic surfactants. In addition, the term "comprising," which is synonymous with "including" or "containing," is inclusive, open-ended, and does not exclude additional unrecited elements or method steps.

As used herein, the term "and/or" means one, more than one, or all of the listed elements.

Also herein, the recitations of numerical ranges by endpoints include all numbers subsumed within that range (e.g., 1 to 5 includes 1, 1.5, 2, 2.75, 3, 3.80, 4, 5, etc.).

As used herein, the term "drive fluid" can include a liquid, a gas, a dispersion or a mixture thereof, which is used in enhanced petroleum recovery. Examples of a drive fluid can include, but are not limited to, water, brine, connate water, surface water, distilled water, carbonated water, sea water, a foam, an emulsion, an aqueous solution containing a polymer, carbon dioxide, hydrogen sulfide ($H_2S$), steam, a hydrocarbon-containing gas, an inert gas, air, oxygen or mixtures thereof. For brevity, the word "drive fluid" will be used herein, where it is understood that one or more of the examples provided above, or mixtures thereof, can be used interchangeably.

As used herein, a "surfactant" refers to a chemical compound that reduces interfacial tension between at least two fluids or a fluid and a gas.

As used herein, a "critical micelle concentration" or "CMC" refers to the concentration of a surfactant above which micelles are spontaneously formed.

As used herein, an "emulsion" refers to a colloidal suspension of two immiscible substances, where one substance (the dispersed phase) is dispersed in the other (the continuous phase).

As used herein, a "foam" refers to a colloid in which particles of a gas are dispersed throughout a liquid.

As used herein a "dispersion" refers to a two-phase system where one phase consists of finely divided particles of a liquid, gas, or supercritical fluid distributed throughout a bulk substance, the particles being the disperse phase and the bulk substance the continuous phase. Examples of a dispersion include a foam and/or an emulsion.

As used herein, a "nonionic surfactant" refers to a surfactant where the molecules forming the surfactant are electrically uncharged (molecules are not converted into ions).

In the context of the present disclosure, the term "aliphatic group" means a saturated or unsaturated linear or branched hydrocarbon group. This term is used to encompass a saturated linear or branched monovalent hydrocarbon group including, for example, acyclic groups, alkyl groups having the general formula $C_nH_{2n}$ or $C_nH_{2n+1}$) depending upon its location in a compound, unsaturated, linear or branched monovalent hydrocarbon groups with one or more olefinically unsaturated groups (i.e., carbon-carbon double bonds); and unsaturated, linear or branched monovalent hydrocarbon groups with one or more carbon-carbon triple bonds.

The term "cyclic group" means a closed ring hydrocarbon group that is classified as an alicyclic group, aromatic group, or heterocyclic group.

The term "alicyclic group" means a cyclic hydrocarbon group having properties resembling those of aliphatic groups.

The term "aromatic group" or "aryl group" means a mono- or polynuclear aromatic hydrocarbon group.

The term "heterocyclic group" means a closed ring hydrocarbon in which one or more of the atoms in the ring is an element other than carbon (e.g., nitrogen, oxygen, sulfur, etc.).

As used herein, the term "branched alkyl" means a monovalent hydrocarbon group having a branched chain arrangement of the constituent carbon atoms, where such a structure can be saturated or unsaturated.

As used herein, the term "petroleum" means a highly complex mixture of paraffinic, cycloparaffinic (naphthenic), and aromatic hydrocarbons that can be refined or separated by distillation.

As used herein, the term "supercritical phase" means a dense gas that is maintained above its critical temperature (the temperature above which it cannot be liquefied by pressure).

As used herein, the term "Hydrophilic-Lipophilic Balance" or "HLB" is a measure of the degree to which a surfactant is hydrophilic or lipophilic as determined based on calculating values from different regions of the surfactant molecule. HLB values provided herein are determined using the method of Guo et al. (Guo, X.; Rong, Z.; Ying, X. Calculation of hydrophile-lipophile balance for polyethoxylated surfactants by group contribution method. Journal of Colloid and Interface Science 2006, 298, 441-450).

DETAILED DESCRIPTION

Embodiments of the present disclosure include dispersion compositions for use in enhanced petroleum recovery, where the dispersion composition includes carbon dioxide, water, and a nonionic surfactant. Embodiments of the present disclosure also include methods of using the dispersion compositions in petroleum recovery processes. For the various embodiments, the nonionic surfactant of the present disclosure can promote the formation of a stable dispersion of carbon dioxide and water from the dispersion composition, even in the presence of high salinity and temperature. Other dispersion compositions that include the nonionic surfactant of the present disclosure are also possible.

As discussed herein, the nonionic surfactant of the dispersion composition helps to reduce the interfacial tension between carbon dioxide and water. For the various embodiments, the nonionic surfactant used in the dispersion composition of the present disclosure has the formula:

where $R^1$ and $R^3$ or $R^1$ and $R^2$ are each independently a linear, a branched, a cyclic or an acyclic aliphatic group having 4 to 18 carbon atoms, with a remaining one of $R^1$, $R^2$ or $R^3$ being where $R^4$ is an aliphatic group having 2 to 4 carbon atoms and y is an integer from 9 to 40 inclusive.

So, for example, when $R^1$ and $R^3$ are each independently a linear, a branched, a cyclic or an acyclic aliphatic group having 4 to 18 carbon atoms, then $R^2$ is —$(R^4O)_y$—H. Similarly, when $R^1$ and $R^2$ are each independently a linear, a branched, a cyclic or an acyclic aliphatic group having 4 to 18 carbon atoms, then $R^3$ is —$(R^4O)_y$—H. For the above formula, $R^1$ and $R^3$ or $R^1$ and $R^2$ may represent aliphatic groups of identical or different lengths (i.e., $R^1$ and $R^3$ or $R^1$ and $R^2$ are each of a different length). For the various embodiments, y can be an integer from 9 to 20 inclusive. For the various embodiments, $R^4$ can be a linear alkyl group of 2 carbon atoms.

For the various embodiments, the efficiency of the nonionic surfactant in the dispersion composition can depend upon the number and arrangement of carbon atoms in the aliphatic groups of $R^1$, $R^2$, $R^3$ and/or $R^4$ and the value of y. For example, suitable values for a sum of carbon atoms in $R^1+R^3$ or $R^1+R^2$ can be 10 to 28. Other examples of suitable values for a sum of carbon atoms in $R^1+R^3$ or $R^1+R^2$ can be 12 to 24. In one embodiment the sum of carbon atoms in $R^1+R^3$ or $R^1+R^2$ can be 16. For this latter example, the nonionic surfactant used in the dispersion composition can have the formula:

where y is an integer from 9 to 20 inclusive. Other formulae are also possible. For the various embodiments, the nonionic surfactants used in the dispersion compositions of the present disclosure can be prepared as discussed in U.S. Pat. No. 2,932,616, Selective synthesis of aliphatic ethylene glycol sulfonate surfactants, (Gautun, Odd R.; Carlsen, Per H. J.; Maldal, Trygve; Vikane, Olav; Gilje, Eimund. Inst. Organic Chem., Univ. Trondheim-NTH, Trondheim, Norway. Acta Chemica Scandinavica (1996), 50(2), 170-7. Publisher: Munksgaard), and/or International Publication Number WO 2008/134390 A1, both of which are incorporated herein by reference in their entirety. For example, a glycerol-1,3-dialkyl ether can be prepared by reacting the alcohol of the desired alkyl group (or groups where a mixture of alkyls of different sizes are used) with epichlorohydrin. An example of forming a glycerol-1,2-dialkyl ether can be found in Japanese Patent No. JP3258740 (A) to Komori Takashi et al., which is incorporated herein by reference in its entirety. The reaction can then proceed by condensing a suitable cyclic ether (e.g., ethylene oxide, oxetane, tetrahydrofuran) in the substantial absence of oxygen and in the presence of an alkaline catalyst or condensing agent with either the glycerol-1,3-dialkyl ether having the formula:

or a glycerol-1,2-dialkyl ether having the formula:

For the various embodiments, the nonionic surfactant of the present disclosure can optionally include a linking group that joins the —$(R^4O)_y$—H group, as provided herein, to the glycerol dialkyl ether group. For the various embodiments, the linking group can have the general formula:

where $R^5$, $R^6$, $R^7$, and $R^8$ are each independently selected from the group of H, branched alkyl, linear alkyl, cyclic alkyl and alkaryl groups having 1 to 6 carbon atoms, with the proviso that one or more of the following apply: that $R^5$, $R^6$, $R^7$, and $R^8$ cannot all be H and the total number of carbon atoms in $R^5+R^6+R^7+R^8$ is less than or equal to about 8. Examples of such linking groups can include, but are not limited to, alkylene oxides, such as propylene oxide, butylene oxide, styrene oxide, isobutylene oxide, hexene oxide, octene oxide, and cyclohexene oxide, which can increase carbon dioxide solubility.

For the various embodiments, the nonionic surfactants discussed herein can be used in forming or creating a dispersion formed of carbon dioxide and water that is suitable for use in enhanced petroleum recovery processes. For example, the nonionic surfactants discussed herein can be used as part of a dispersion composition, according to the present disclosure, for use in enhanced petroleum recovery. As used herein, a dispersion that is suitable for use in enhanced petroleum recover processes refers to a dispersion that remains as a dispersion (e.g., a foam that does not break down or dissolve) for a duration sufficient for its intended purpose in enhanced petroleum recovery.

For the various embodiments, the amount of nonionic surfactant used in the dispersion composition can be an amount of 0.001 to 5 volume percent, based on a total volume of the dispersion composition. In additional embodiments, the amount of nonionic surfactant used in the dispersion composition can be in a range of 0.01 to 1 volume percent, based on a total volume of the dispersion composition. In further embodiments, the amount of nonionic surfactant used in the dispersion composition can be in a range of 0.05 to 0.5 volume percent, based on a total volume of the dispersion composition.

In some embodiments, nonionic surfactants of the present disclosure can include other additives. For example, the composition can include corrosion inhibitors, co-surfactants, scale inhibitors, mixtures thereof, as well as other additives. In some embodiments, the total amount of the additives added to the nonionic surfactants of the present disclosure is not greater than about 5 weight percent, based on a total weight of the composition.

In an effort to determine and verify that the nonionic surfactants of the present disclosure will form a dispersion suitable for use in enhanced petroleum recovery processes, the nonionic surfactants of the present disclosure can be screened in a screening method. The screening method includes passing a dispersion composition of the nonionic surfactant, carbon dioxide, and water through a layer of sand at about 4 milliliters per minute (ml/min), at a temperature and pressure that is representative of a subterranean formation in which the nonionic surfactant is to be used in order to create a dispersion of carbon dioxide and water. In one embodiment, such a representative temperature can be 40° C., and a representative pressure can be about 2,000 pounds per square inch (psi). A more detailed description of the screening method is described in the Examples Section herein.

In some embodiments, the amount of carbon dioxide, water, and nonionic surfactant of the dispersion composition passed through the layer of sand can be about 90 volume percent carbon dioxide, about 10 volume percent water, and about 0.1 weight percent nonionic surfactant, based on a total weight of the composition. In addition, the testing conditions (e.g., 4 ml/min at 40° C. and 2,000 psi) can be chosen because they are representative of conditions in the subterranean formation. However, embodiments of the present disclosure also include the screening method using other testing conditions that would be representative of other subterranean formation conditions, as is discussed herein.

As discussed herein, the screening method can be used to determine whether the dispersion formed of the nonionic surfactant, carbon dioxide and water will be suitable for enhanced petroleum recovery processes. Since one purpose of forming the dispersion of the nonionic surfactant, carbon dioxide and water can be to channel carbon dioxide into previously unswept portions of the subterranean formation, as discussed herein, the dispersion may need to maintain an apparent viscosity of at least 50 centipoise (cps) up to about 300 cps at the temperature representative of the subterranean formation in which it will be used.

As appreciated by one skilled in the art, viscosity is used to describe a fluid's resistance to flow: more specifically, viscosity is the ratio of the shearing stress to the velocity gradient in a fluid. For the dispersion formed of the nonionic surfactant, carbon dioxide and water an apparent viscosity is used to better describe the dispersion's resistance to flow in embodiments herein. By having an apparent viscosity of at least 50 cps at the temperature representative of the subterranean formation in which it will be used, the dispersion formed of the nonionic surfactant, carbon dioxide and water can slow down the flow of carbon dioxide into the subterranean formation while also blocking portions of the subterranean formation that have been previously depleted using other recovery techniques.

The apparent viscosity of the dispersions formed of the nonionic surfactant, carbon dioxide and water of the present disclosure can be determined using the equation:

$$\eta_{apparent} = \frac{\tau}{\dot{\gamma}} = \frac{\left(\frac{\Delta P \cdot R}{L}\right)}{\left(\frac{U}{R}\right)} \lambda = \frac{\lambda R^2 \Delta P}{LU}$$

where the factoring term, $\lambda$, is set to 0.5 and R describes a radius of a capillary tube used in an apparatus for measuring the apparent viscosity, $\Delta P$ is a measured pressure drop across the capillary tube, L is a length of the capillary tube, and U is the velocity of the dispersion. The apparatus used in the screening process, as well as the apparent viscosity are described in more detail in the Example Section herein.

In addition, the nonionic surfactants of the present disclosure have a cloud point. The cloud point can be defined as the temperature at which a surfactant becomes insoluble in water at a given surfactant concentration and a salinity of the water. For the nonionic surfactants of the present disclosure, the water solubility of the surfactant is governed by the ability of water to hydrate the nonionic surfactant. Typically, once the temperature of the subterranean formation approaches a cloud point of a surfactant, the dispersion can become unstable since the surfactant is no longer completely soluble in water at a temperature above the cloud point, and thus cannot encourage the formation of a dispersion.

In contrast to this, the nonionic surfactants of the present disclosure are able to promote the formation of a dispersion at temperatures that are at or slightly above their cloud point (e.g., as much as 5° C. above the cloud point). As such, in embodiments where the subterranean formation temperature is increased, a nonionic surfactant can be used in enhanced petroleum recovery processes as described herein. In addition, the nonionic surfactants of the present disclosure also maintain a hydrophilic-lipophilic balance (HLB) of about 7 to about 20. HLB values in this range generally indicate good dispersion stabilizing surfactants for carbon dioxide and water.

As discussed herein, the dispersion composition for use in enhanced petroleum recovery of the present disclosure can include the nonionic surfactant, carbon dioxide and water. As discussed herein, the term "water" as used with the dispersion composition of the present disclosure can be, for example, a brine. One advantage of using the nonionic surfactants of the present disclosure in forming a carbon dioxide/water form is their high salt tolerance due to their nonionic nature. A brine is water saturated or with a high concentration of salt. A brine solution may contain as little as 0.2 weight percent salt, based on total weight of the brine solution, or the brine solution may contain salt up to the saturation concentration of salt, which may exceed 15 weight percent, based on total weight of the brine solution, depending on the temperature of the brine solution. Such salts can include sodium chloride, calcium chloride, and/or magnesium chloride, among others. In some embodiments, the brine can include from 2 to 10 weight percent sodium chloride, 0.5 weight percent calcium chloride, and 0.1 weight percent magnesium chloride in deionized water. Other brines are also possible.

Carbon dioxide can be included in the dispersion compositions of the present disclosure at a lower limit of about 60 volume percent or greater, based on a total volume of the water and carbon dioxide. In an additional embodiment, carbon dioxide can be included at a lower limit of about 70 volume percent or greater, based on a total volume of the water and carbon dioxide. In an additional embodiment, carbon dioxide can be included at a lower limit of about 80 volume percent or greater, based on a total volume of the water and carbon dioxide. Carbon dioxide can also be included in embodiments of the present disclosure at an upper limit of about 90 volume percent or less, based on a total volume of the water and carbon dioxide. In an additional embodiment, carbon dioxide can be included at an upper limit of about 94 volume percent or greater, based on a total volume of the water and carbon dioxide. In an additional embodiment, carbon dioxide can be included at an upper limit of about 97 volume percent or greater, based on a total volume of the water and carbon dioxide. Embodiments also include carbon dioxide in a range combining one of the lower limit with one of the upper limit as listed herein with regard to carbon dioxide volume percentages.

Carbon dioxide is also a noncondensable gas (e.g., a gas that is not easily condensed by cooling). As appreciated by one skilled in the art, for a given petroleum temperature, the noncondensable gas can become miscible with petroleum above a pressure known as the minimum miscibility pressure (MMP). Generally the carbon dioxide has to be a liquid and/or in a supercritical phase for it to be miscible with petroleum. Embodiments of the present can be implemented above the MMP, which may allow for higher recovery. Implementing the embodiments of the present disclosure below the MMP may also increase mobility and sweep of the petroleum and thus allow for recovery in immiscible floods.

Although embodiments described herein include carbon dioxide as the noncondensable gas of the present disclosure, one skilled in the art will appreciate that other noncondensable gases may also be included in place of carbon dioxide and/or in addition to carbon dioxide. Examples of other possible noncondensable gases include, but are not limited to, nitrogen, natural gas, methane, propane, butane, ethane, ethylene, hydrogen sulfide, carbonyl sulfide, air, combustion flue gas, mixtures of methane with ethane, argon, light hydrocarbons, and mixtures thereof, among others.

When the nonionic surfactant of the present disclosure is injected with the carbon dioxide and water (i.e., the dispersion composition) into the subterranean formation containing petroleum (e.g., liquid hydrocarbon), the nonionic surfactant can promote the formation of a dispersion from carbon dioxide and water. For the various embodiments, the carbon dioxide of the dispersion composition can be in the form of a liquid and/or in a supercritical phase. In addition, the carbon dioxide and water of the dispersion composition can be in a liquid and/or a supercritical phase in the subterranean formation.

For the various embodiments, the dispersion composition can be used to generate a dispersion using a number of different dispersion generation techniques. For the various embodiments, the dispersion can be generated prior to injection into the subterranean formation. For example, separate streams of the water with the nonionic surfactant and the carbon dioxide can be injected via tubing positioned in an injection well, where they are mixed, for example, in a static mixer or other dispersion generating apparatus positioned within the tubing. For the various embodiments, the streams can be mixed above ground to form the dispersion prior to injection into a subterranean formation.

In addition, the nonionic surfactant can be introduced into the field with water, and the carbon dioxide can be injected behind the nonionic surfactant, termed a surfactant-alternating-gas (SAG) process. Once the carbon dioxide hits the nonionic surfactant in the subterranean formation, the shearing forces can create the dispersion. Other methods of forming a dispersion within a subterranean formation are described in U.S. Pat. No. 4,380,266, which is incorporated herein by reference.

For the various embodiments, the dispersion formed from the dispersion composition of the present disclosure can be injected into a subterranean formation via the injection well under a pressure sufficient to cause the dispersion to enter the formation. For example, the nonionic surfactant can be injected into the reservoir with water, and then carbon dioxide can be injected after injecting the nonionic surfactant with water into the subterranean formation. In addition, in some embodiments, the nonionic surfactant can be injected into the reservoir with both water and carbon dioxide, where the nonionic surfactant can be included in the water.

The method of the present disclosure can be employed in enhanced petroleum recovery processes to recover petroleum from subterranean formations penetrated by at least one injection well and one production well. For example, the method can be used as part of a sweep improvement process in conjunction with a secondary recovery operation, such as a water flood or a polymer flood, or a tertiary recovery operation, for example, an alkaline flood or a gas flood.

For various embodiments of secondary recovery operations, the dispersion formed from the dispersion composition of the present disclosure can enter and flow within the fractures of the subterranean formation. Once a sufficient amount of the dispersion has been injected into the subterranean formation (e.g., an amount sufficient to cause a breakthrough of the dispersion at a production well) a drive fluid, as described herein, can be injected in to the subterranean formation through the injection well. For the various embodiments, the dispersion formed from the dispersion composition of the present disclosure can remain stable over a time interval of at least about 24 hours. Thus, the dispersion can be is sufficiently stable and viscous to displace petroleum present within fractures in the subterranean formation, but will eventually break down to gas and a surfactant and an aqueous solution within a predetermined period of time in order to permit removal thereof from the fractures by a subsequently injected dispersion or other drive fluid. The stability of such dispersion can be predetermined by varying surfactant chemistry, composition, and concentration, among other factors.

For the various embodiments, the high apparent viscosity of the dispersion can help to cause an increase in the differential injection pressure encountered in the fractures by a subsequently injected drive fluid thereby tending to divert the flow path of such fluid from the fractures into the formation matrix. Thus, in accordance with various embodiments of the present invention, the dispersion formed from the dispersion composition of the present disclosure can be injected into and can occupy at least a portion of the fractures of a fractured subterranean formation. Thereafter, the drive fluid can be injected into the fractured subterranean formation via the same or different well(s). Upon encountering the dispersion within the fractures, the relatively high viscosity of the dispersion present in a portion of the subterranean fractures provides an increased pressure differential thereby diverting at least a portion of the drive fluid into the formation matrix which results in an improved sweep efficiency of the petroleum from the formation matrix and/or fractures by the drive fluid.

The embodiments of the present disclosure can also include methods for recovering petroleum from a subterranean formation penetrated by at least one injection well and one production well through a gas flooding process. Since gas flooding processes are typically a tertiary recovery process performed after water flooding, the petroleum left in the subterranean formation tends to be in hard to reach areas. Also, most of the subterranean formation is filled with water from a water flooding procedure. As such, embodiments of the present disclosure include selecting a nonionic surfactant of the present disclosure, and injecting the nonionic surfactant with water into the subterranean formation via the injection well to form the dispersion from the dispersion composition in the subterranean formation.

In the gas flooding process, noncondensable gases (e.g., carbon dioxide) used under miscible conditions dissolve into and swell the petroleum. As used herein "dissolving" into the petroleum refers to the process where the noncondensable gas in the stable dispersion passes into solution with the liquid hydrocarbons. As the petroleum swells, its viscosity is reduced. For the various embodiments, carbon dioxide can be used as the noncondensable gas. Since the carbon dioxide has a low viscosity relative to the liquid hydrocarbons, the viscosity of the petroleum will decrease as the carbon dioxide dissolves into the liquid hydrocarbons. By allowing the carbon dioxide to dissolve into the hydrocarbons, the viscosity of the petroleum in the subterranean formation is lowered allowing it to more readily flow than if the carbon dioxide had not dissolved into the liquid hydrocarbons. By reducing the viscosity of the petroleum in this manner, the petroleum can flow into a production well linked to the subterranean formation where it can be recovered.

In these tertiary processes, one purpose for the dispersion can be to inhibit the flow of the noncondensable gas into that portion of the subterranean formation containing only residual petroleum. In other words, the dispersion can block the flow of the noncondensable gas into portions of the subterranean formation where petroleum has been recovered using previously performed recovery processes. Therefore, the dispersion forces the noncondensable gas to drive the recoverable petroleum from the less depleted portions of the subterranean formation toward the production well.

It is to be understood that the above description has been made in an illustrative fashion, and not a restrictive one. Although specific embodiments have been illustrated and described herein, those of ordinary skill in the art will appreciate that other uses for the nonionic surfactants and dispersion formed therefrom are possible. For example, the nonionic surfactants and/or dispersions formed therefrom may be useful in recovering other hydrocarbons present in soils or rocks, such as in soil remediation. The claims are intended to cover such adaptations or variations of various embodiments of the disclosure, except to the extent limited by the prior art.

Embodiments of the present disclosure are illustrated by the following examples. It is to be understood that the particular examples, materials, amounts, and procedures are to be interpreted broadly in accordance with the scope and spirit of the disclosure as set forth herein.

EXAMPLES

The following examples are given to illustrate, but not limit, the scope of this disclosure. Unless otherwise indicated, all parts and percentages are by weight. Weight percent is the percentage of one compound included in a total mixture, based on weight. The weight percent can be determined by dividing the weight of one component by the total weight of the mixture and then multiplying by 100. The symbol v/v means by volume in the aqueous phase for surfactants unless otherwise stated. Unless otherwise specified, all instruments and chemicals used are commercially available.

Materials

Sodium chloride (GR crystals) from EM Science is used as received. Decane (certified n-decane), magnesium chloride (hexahydrate, enzyme grade), and calcium chloride (certified ACS dihydrate) are used as received from Fisher Scientific.

Deionized (DI) water is used throughout from a Nanopure™ II (Barnstead, Dubuque, Iowa) with an average conductance of 16 ohms.

2-ethylhexanol available from Sigma-Aldrich®, St. Louis, Mo.

Potassium hydroxide available from Sigma-Aldrich®, St. Louis, Mo.

Brine solutions are made including from about 2 to about 10 percent by weight NaCl, 0.5 percent by weight calcium chloride ($CaCl_2$), and 0.1 percent by weight magnesium chloride ($MgCl_2$) in DI water.

Instrument-grade carbon dioxide (>99.99% pure, Praxair Distribution, Inc.)

Pluronic® L62 Block Copolymer Surfactant (L62, BASF Corporation)

Tergitol™ TMN-6 Surfactant (TMN-6, The Dow Chemical Company)

Tergitol™ 15-S-7 Surfactant (15-S-7, The Dow Chemical Company)

Tergitol™ 15-S-20 Surfactant (15-S-20, The Dow Chemical Company)

Surfactant Synthesis

The following procedure exemplifies a standard procedure for making 2-ethyl-1-hexanol (EH) based surfactants (2-EH-$PO_5$-$EO_9$, 2-EH-$PO_5$-$EO_{11}$, 2-EH-$PO_5$-$EO_{13}$, 2-EH-$PO_5$-$EO_{15}$) using alkoxylation. In addition, one skilled in the art will appreciate that this is an exemplary procedure and that other components can be substituted or removed in the procedure (e.g., removing propylene oxide (PO) in forming 2-EH-$EO_{11.8}$) to make a similar surfactant solution. For example, the following example includes a catalyzation step with solid potassium hydroxide (KOH).

Alkoxylation of 2-Ethylhexanol

About 846 grams (g) of 2-ethylhexanol is catalyzed with about 2.98 grams of solid potassium hydroxide (KOH) and dehydrated under 30 millimeters of mercury (mm Hg)/Nitrogen at about 100 degrees Celsius (° C.) for about 30 minutes. This material is then propoxylated by pumping a stoichiometric amount of propylene oxide (PO) for the desired surfactant into a reactor at a temperature of about 130° C. The reaction is allowed to continue at about 130° C. until the PO has reacted. This material is then ethoxylated by pumping a stoichiometric amount of ethylene oxide (EO) into the reactor. After complete reaction, measured by when the pressure inside the reactor reaches ambient pressure, the mixture is neutralized at about 70° C. by treating with magnesium silicate or neutralized with acetic acid.

Procedures for synthesizing the remaining surfactants used in the Examples section can be found in U.S. Pat. No. 2,932,616 and/or International Publication Number WO 2008/134390 A1, both of which are incorporated herein by reference in their entirety.

Cloud Point Temperature

The cloud point temperature of the surfactant in an aqueous phase was measured with a surfactant concentration of 1% v/v. The aqueous phase consisted of either pure DI water or a brine solution (with 2% NaCl, 1% $CaCl_2$, and 0.5% $MgCl_2$ w/w in water). The surfactant solutions were heated slowly from 24 to 80° C. and the temperature at which each solution turned hazy was recorded and repeated with a maximum error of approximately ±1° C. The cloud point temperature of commercially available surfactants was given as reported by the manufacturer.

Interfacial Tension Measurement

The interfacial tension between $CO_2$ and aqueous surfactant solutions is determined from axisymmetric drop shape analysis of a captive bubble (as reported in Prokop, R. M.; Jyoti, A.; Eslamian, M.; Garg, A.; Mihaila, M.; del Rio, O. I.; Susnar, S. S.; Policova, Z.; Neumann, A. W. A study of captive bubbles with axisymmetric drop shape analysis. *Colloids and Surfaces, A: Physicochemical and Engineering Aspects* 1998, 131, 231-247). The surface pressure ($\pi$) is the difference between $\gamma_o$ (no surfactant) and $\gamma$ (with surfactant).

Surface Tension and CMC Measurements

Surface tension and CMC data were obtained using a KRÜSS™ Tensiometer K100 at 25° C. in water. For this test the surface tension of a surfactant-water solution is measured while incrementally adding the surfactant to DI water. Results are measured in terms of dyne/centimeters using a Wilhelmy plate. Results are recorded versus surfactant concentration. The Critical Micelle Concentration is the point at which an increase in surfactant concentration no longer results in a change in surface tension.

Apparent Viscosity of Carbon Dioxide/Water (C/W) Dispersions

Figure 1:
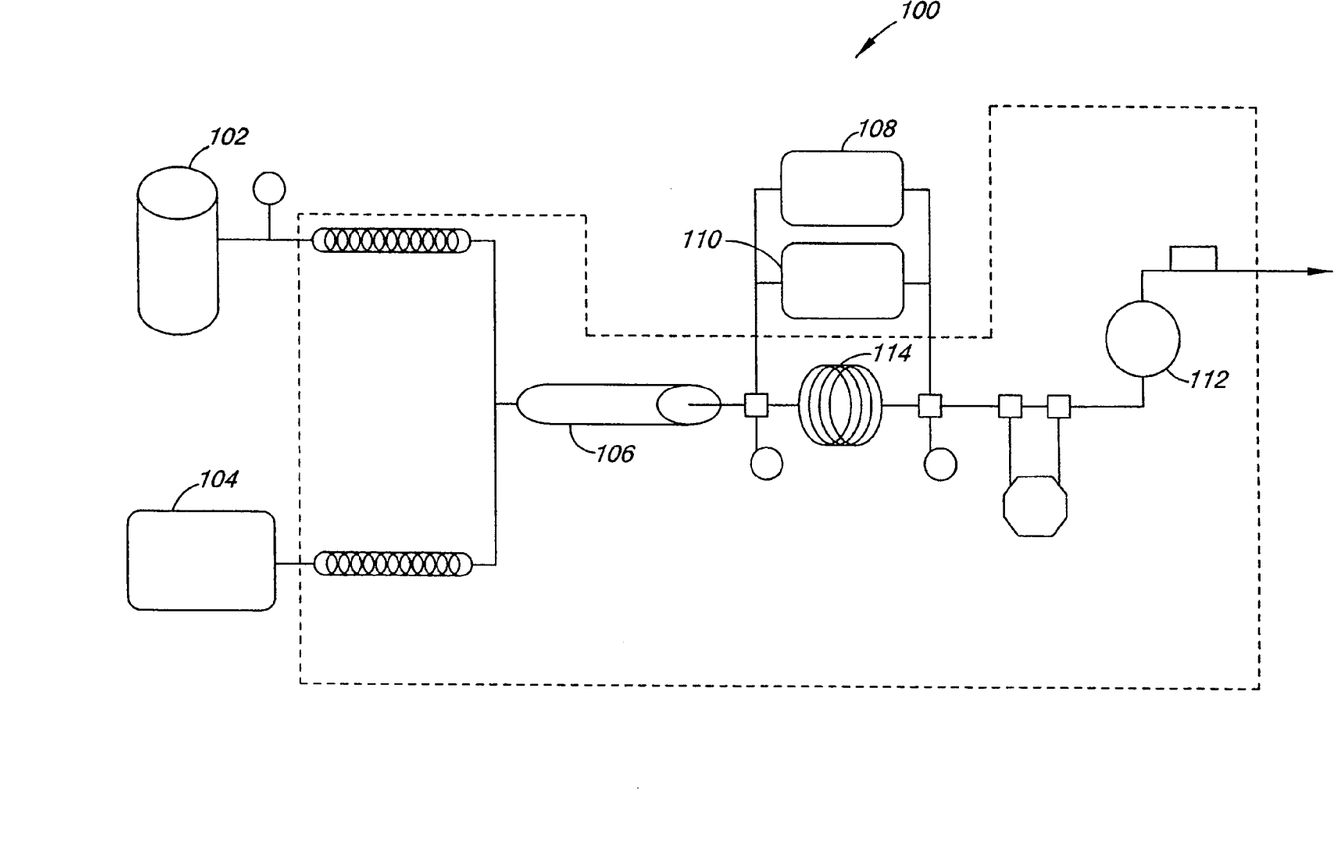
FIG. 1 illustrates an embodiment of the apparatus used to measure dispersion viscosity according to the present disclosure, as described in Example 1.

The apparatus 100 to measure C/W dispersion viscosity is depicted in FIG. 1. Before beginning, the system is equilibrated to 40° C. Carbon dioxide and the surfactant solution are pumped simultaneously into the system through two pumps 102 and 104, where the carbon dioxide is pumped through pump 102 (Isco syringe pump (model 260D) with a series D pump controller) and the surfactant solution is pumped using pump 104 (an HPLC dual head pump, LDC/Milton Roy consta Metric III). The mixture of $CO_2$ and surfactant solution entered a sand pack 106 with hydrophilic pores for C/W dispersion generation. The sand pack 106 was either 10.2 cm long, 0.386 cm inner diameter tube packed with pre-washed 20-40 Mesh non-spherical sand (420-840 μm in diameter) that gives 50 μm pores or a 12.1 cm long, 0.76 cm inner diameter tube packed with non-spherical sand of 125 μm diameter that gives 10 μm pores. Sand was held in place by wire screens affixed to tubing ends Between tests, the sand pack 106 was rinsed with a few hundred ml of ethanol and several liters of DI water until the effluent was surfactant-free. Then surfactant pre-adsorption was accomplished by running a sufficient volume of surfactant solution (20-50 mL) thru the sand pack 106 to pre-equilibrated the sand with surfactant.

The dispersion generated in the sand pack 106 flowed through a six-port valve (Valco Instruments, model C6W) followed by a capillary (0.0762 cm i.d., 195 cm long). The differential pressure (ΔP) across the capillary was measured by either a high-range 108 or a low-range 110 differential pressure meter (Validyne model CD23). The high-range pressure meter 108 contained a 100 psia diaphragm, while the low ranged pressure meter 110 contained a 20 psia diaphragm. An average ΔP value is obtained with a pressure transducer placed on the apparatus 100 on either diaphragm in use 108, 110. As dispersion forms, the pressure inside the capillary can oscillate. When the average value recorded on the transducer every 2 minutes varies by less than about 15 percent, the apparatus has reached steady state.

The effluent of the capillary flowed through a second six-port valve (Valco Instruments, model C6W) into a stainless steel cylindrical visual cell 112 with two sapphire windows (0.4 cm path length and 1.8 cm diameter) where macroscopic visual observations of the bulk flowing dispersion were made. The pressure of the system is maintained near 2,000 psi by means of a back pressure regulator. The temperature of the entire apparatus was maintained at ±0.2° C. by use of a water bath equipped with one or more temperature controllers (Julabo, Inc.).

The apparent viscosity of the C/W dispersion ($\eta_{dispersion}$) is calculated from the known shear rate ($\gamma$) and measured pressure difference (ΔP) across the capillary with a length (L) of 195 cm. The shear stress ($\tau$) and shear rate are calculated from $\Delta P R_{cap}/L$ and the velocity gradient ($U/R_{cap}$), respectively. The average velocity, U, is determined from the total volumetric flow rate of the C/W dispersion (the sum of the flow rates for the two phases, $Q_{total}$) divided by the cross sectional area of the capillary tube. An additional geometric scaling term, λ=0.5, is used to calculate the apparent dispersion viscosity $$\eta_{foam} = \frac{\tau}{\dot{\gamma}} = \frac{\left(\frac{\Delta P \cdot R_{cap}}{L}\right)}{\left(\frac{U}{R_{cap}}\right)} \lambda = \frac{\lambda R_{cap}^2 \Delta P}{LU} \quad [1]$$

where $R_{cap}$ is the capillary tube radius (0.0381 cm).

Carbon Dioxide and Water (C/W) Dispersion Microscopy and Stability

The in-situ characterization of bubble sizes and size distributions of the C/W dispersion was measured by diverting C/W dispersion flow after the sand pack 106 or capillary tube 114 to a high-pressure microscopy cell with the two six-port injection valves. One valve determined the sampling point for the C/W dispersion and the second controlled flow through the microscopy cell 112. The microscopy cell 112 was mounted on a microscope (Nikon Eclipse ME600). Sapphire windows (Swiss Jewel Company, W6.36, 0.635 cm diameter and 0.229 cm thickness) of the cell 112 were separated with foil spacers creating a path length of approximately 25 μm.

When flow through the cell 112 was stopped, microscopy images were captured via a Photometrics CoolSNAP CF CCD camera connected to a computer. C/W dispersion was flowed through the microscopy cell for several cell volumes prior to image recording to ensure the C/W dispersion photographed had not aged significantly. The CCD camera was programmed to take photos at set time intervals (from <1 s to several hrs) to provide stability measurements over time. The temperature of the microscope cell and tubing was controlled by electrical heating tape (thermolyne briskheat flexible electric tape, Barnstead/thermolyne) wrapped around the microscopy cell and tubing and thermostated using a temperature controller (Omega CN7600, Omega) at the same temperature as the water bath.

The images were analyzed with ImageJ software by setting the scale using microscopy standards, adjusting the threshold value of the image, and using the measure particles function. In most cases bubble areas with a circularity of 0.60 or greater were obtained and thus converted to spherical radii. Size distribution parameters and average radii were then calculated using the formulas below. The minimum bubble size that could be measured had a diameter of 0.4 μm at 50× magnification, 0.88 μm at 20× magnification, and 1.8 μm at 10× magnification; bubbles smaller than these values could not be detected with the microscope and were not sized.

To determine average bubble sizes for a given shear rate, 6-9 microscope images at each condition were analyzed, corresponding to at least several hundred bubbles and up to 10,000 bubbles. The Sauter mean diameter of a given dispersion, $D_{sm}$, is calculated as follows $$D_{sm} = \frac{\sum_i D_i^3}{\sum_i D_i^2} \quad [2]$$

where $D_i$ is the diameter of a dispersion bubble. Number average diameters, $D_{avg}$, can also be calculated from the $D_i$ values.

Stability of the C/W dispersion is measured by photographing a given C/W dispersion over known time increments. When formed, the C/W dispersion is trapped in the microscopy cell. Initially, the dispersion is photographed every 1 sec for 2 minutes starting immediately after flow was stopped. After collection of the C/W dispersion photographs, the stack of images is converted using the last images with the largest sizes to determine the threshold values for the stack. A circularity of about 0.3 is used. The bubbles greater than 0.4 μm in diameter are measured from the C/W dispersion photos for every 5 seconds to track size changes over time. Then the total volume of the bubbles (sum of volumes of all the measured bubbles), and $D_{sm}$ (equation 2) are calculated for each of these times. Plots are made of these properties over time and dv/dt is determined as the slope of the measured volume as a function of time. For the stability of larger bubble sizes over longer times, a single layer of bubbles on the order of 1 to 100 μm was trapped in the microscopy cell and measured over various times. The images are analyzed using the appropriate microscopy scale and circularity (generally 0.5-0.6) at known times.

Results

Table 1 presents the measured cloud point temperatures for the surfactants in water and brine (2% NaCl, 1% $CaCl_2$, and 0.5% $MgCl_2$ w/w in water) at 1% v/v surfactant. The hydrophilic-lipophilic balance (HLB) of the surfactants is also listed as calculated from the group contribution method of Guo et al. (Guo, X.; Rong, Z.; Ying, X. Calculation of hydrophile-lipophile balance for polyethoxylated surfactants by group contribution method. Journal of Colloid and Interface Science 2006, 298, 441-450). The HLB of the commercial surfactants as reported by the manufacturer are presented in parenthesizes.

The measured apparent viscosities (calculated using the measured ΔP in equation 1) of the C/W dispersions ($\eta_{dispersion}$) (in a capillary tube at varying temperatures are also presented in Table 1 with the initial $D_{sm}$ (equation 2) of the dispersion bubbles. The majority of the C/W dispersions contained a quality of 90% v/v $CO_2$ and the C/W dispersions were stabilized with 1% v/v surfactant (in the aqueous phase) at approximately 2000 psia. The C/W dispersions were generated with the 50 μm pore sand pack and at a total dispersion flow rate ($Q_{total}$) of 6 ml/min. The $\eta_{dispersion}$ as measured by the ΔP are also listed in Table 1, along with the initial $D_{sm}$ of the C/W dispersion at 24-70° C. and 2000 psia with a quality of 90% v/v $CO_2$ and 1% v/v surfactant unless otherwise noted. A listing of "no dispersion" indicates that slugs of the $CO_2$ and aqueous surfactant solution were observed.

TABLE 1

| | Cloud Point (° C.) | | | Phase Change (° C.) | Dispersion (with Water) at $Q_{total}$ of 6 ml/min | | | | | | | |
|---|---|---|---|---|---|---|---|---|---|---|---|---|
| | | | | | 24° C. | | 40° C. | | 60° C. | | 70° C. | |
| Surfactant | Water | Brine | HLB | | $\eta_{dispersion}$ (cP) | $D_{sm}$ (μm) | $\eta_{dispersion}$ (cP) | $D_{sm}$ (μm) | $\eta_{dispersion}$ (cP) | $D_{sm}$ (μm) | $\eta_{dispersion}$ (cP) | $D_{sm}$ (μm) |
| L62 | (32) | 27 | 8.8 | | $130^\Psi$ | 33 | No dispersion | | No dispersion | | | |
| TMN 6 (5%)$^\Theta$ | $(36)^\beta$ | $31^\beta$ | 12.9 | | 74 | 18 | $18^\epsilon$ | 27 | No dispersion | | | |
| 15-S-7 | (37) | 32 | 12.5 | | 45 | 51 | 17 | 46 | No dispersion | | | |
| 15-S-20 | (>100) | | 16.5 | | 141 | 21 | 94 | 26 | 53 | 34 | 51 | 19 |
| LA—$EO_{12}$ | 56 | | 15.2 | | 14 | 61 | — | | No dispersion | | | |
| 1Hex-$PO_5$—$EO_{13}$ | 78 | | 16 | | 36 | 63 | 90 | 24 | 49 | 35 | No dispersion | |
| 1Hex-$PO_5$—$EO_{15}$ | >80 | | 16.5 | | 46 | 80 | 87 | 25 | 55 | 37 | 59 | 52 |
| 1-octanol-$PO_{4.5}$—$EO_{12}$ | 59 | | 14.9 | | 9 | 41 | No dispersion | | — | | | |

TABLE 1-continued

| | Cloud Point | | | Phase Change | Dispersion (with Water) at $Q_{total}$ of 6 ml/min | | | | | | | |
|---|---|---|---|---|---|---|---|---|---|---|---|---|
| | | | | | 24° C. | | 40° C. | | 60° C. | | 70° C. | |
| | (° C.) | | | | $\eta_{dispersion}$ | $D_{sm}$ | $\eta_{dispersion}$ | $D_{sm}$ | $\eta_{dispersion}$ | $D_{sm}$ | $\eta_{dispersion}$ | $D_{sm}$ |
| Surfactant | Water | Brine | HLB | (° C.) | (cP) | (μm) | (cP) | (μm) | (cP) | (μm) | (cP) | (μm) |
| $C_{12-14}$—$EO_7$ | 52 | | 12.1 | | No dispersion | | — | | — | | | |
| 2-octanol-$PO_9$—$EO_9$ | 45 | 36 | 12.4 | 40-60 ppt | 140 | 47 | 86 | 40 | No dispersion | | | |
| 2-EH—$PO_5$—$EO_9$ | 60 | 54 | 13.6 | 40-60 ppt | 125 | 27 | 101 | 28 | 26 | 61 | No dispersion | |
| 2-EH—$PO_5$—$EO_{11}$ | 71 | | 14.4 | | 190 | 13 | 96 | 46 | 50 | 40 | No dispersion | |
| 2-EH—$PO_5$—$EO_{13}$ | >80 | | 15.1 | | 137 | 14 | 100 | 18 | 49 | 41 | No dispersion | |
| 2-EH—$PO_5$—$EO_{15}$ | >80 | | 15.6 | | 153 | 22 | 140 | 26 | 57 | 35 | 53 | 38 |
| 2-EH—$EO_{11.8}$ | >80 | | 16.2 | | 60 | 39 | 49 | 28 | 43 | 25 | 40 | 35 |
| DOG—$EO_{12}$ | 46 | 38 | 13.9 | 40-60 ppt | 116 | 30 | 74 | 48 | 24 | — | No dispersion | |

(ppt means a separate surfactant rich phase present)

As illustrated in Table 1, DOG-$EO_{12}$ forms a stable C/W dispersion as do L62, 15-S-20, TMN-6, the 2-EH and 1-hexanol surfactants that contain PO and EO. The data provided in Table 1 also validates the screening conditions in that compounds that are known to be poor foamers, such as 15-S-7, LA-$EO_{12}$, 1-octanol-$PO_{45}$-$EO_{12}$, $C_{12-14}$-$EO_7$, 2-EH-$EO_{11.8}$, provide relatively poor results.

With respect to the cloud point, as the temperature of the C/W dispersion is increased close to the cloud point temperature of the surfactant, rapid changes in stability occurred. The precipitation of the surfactant from the water phase into a separate surfactant-rich phase at the cloud point greatly reduces the stability of the C/W dispersion lamella. Consequently, the maximum temperature where a C/W dispersion can be generated depends highly on the cloud point of the aqueous solution. Furthermore, the presence of salts typically makes the surfactants less soluble and depresses the cloud point (Table 1).

The temperatures at which the dispersion could not be observed as a function of the surfactant structure are also presented in Table 1. This temperature is no more than 4° C. above the cloud point for all the surfactants except DOG-$EO_{12}$. For the other surfactants, the C/W dispersion underwent a transition from a highly stable non-coalescing C/W dispersion to only slugs of the two phases with only 1-2° C. increase in temperature above the cloud point.

Table 2 presents the interfacial properties of several surfactants at the carbon dioxide/water interface, including the interfacial tension (γ) and surface pressure (π) at 0.01% w/w surfactant (in the aqueous phase). C/W dispersions consisting of 90% v/v $CO_2$ and 1% v/v surfactant (based on the aqueous phase) at 24° C. and 2000 psia formed with high shear rates ($Q_{total}$ of 12-15 ml/min) through a sand pack with 10 μm pores were studied for stability to coalescence.

The growth rates of these C/W dispersions (defined as the change in volume, v, of large bubbles with $D_{bubble}$>0.4 μm, over time and denoted dv/dt) over 120 seconds are also presented in Table 2 along with the initial D, and $D_{avg}$ of the C/W dispersions. DOG-$EO_{12}$ has the highest π in Table 2 and correspondingly the highest stability (lowest dv/dt value). DOG-$EO_{12}$ provides for a change in the size of the C/W dispersion with time that is relatively low, which means that the C/W dispersion formed with DOG-$EO_{12}$, when not under shear, is stable relative the other surfactants tested. The very high values of dv/dt for 2-EH-$EO_{11.8}$ and LA-$EO_{12}$, illustrate that poor stability is their problem as they display low interfacial tension values (γ). The data in Table 2 further illustrates that DOG-$EO_{12}$, is differentiated from the other surfactants in that it generates low interfacial tension values relative the other surfactants tested.

In addition, in most cases dispersion stability decreased markedly at temperatures no more than 4° C. above the cloud point in water, as the surfactant precipitated. Only DOG-$EO_{12}$ supports a C/W dispersion up to about 14° C. above the cloud point (46° C. in Table 1). The large size of the DOG-$EO_{12}$ tails at the C-W interface (due to the dual tail chains that can independently spread at the interface) is more likely to keep the surfactant solvated at the interface as the solubility in water decreases.

TABLE 2

| Surfactants | CMC (% w/w) | HLB | γ 0.01% w/w (mN/m) | π 0.01% w/w (mN/m) | $D_{sm}$ At $t_o$ (μm) | $D_{avg}$ At $t_o$ (μm) | dv/dt $t_f$=120 s (μm³/s) |
|---|---|---|---|---|---|---|---|
| 2EH—$PO_5$—$EO_9$ | 0.28 | 13.6 | 7.5 | 20.2 | — | — | — |
| 2EH—$PO_5$—$EO_{15}$ | 0.28 | 15.6 | 5.6 | 22.1 | 1.3 | 1.0 | 140 |
| 1Hex-$PO_5$—$EO_{15}$ | 1.47 | 16.5 | 8.5 | 19.2 | 5.3 | 1.2 | 130 |
| DOG—$EO_{12}$ | 0.015 | 13.9 | 4.1 | 23.6 | 1.3 | 1.0 | 50 |
| LA—$EO_{12}$ | 0.21 | 15.2 | 7.9 | 19.8 | 7.3 | 2.1 | >530 |
| 2EH—$EO_{11.8}$ | 0.99 | 16.2 | 12.8 | 14.9 | 2.4 | 1.2 | 375$^\alpha$ |
| 2EH—$PO_5$—$EO_{11}$ | 0.42 | 14.4 | 7.6 | 20.1 | 3.4 | 1.0 | 101 |

In addition, the critical micelle concentration (CMC) values for the surfactants provided in Table 2 also illustrate their efficiency as a surfactant. As shown in Table 2, DOG-EO$_{12}$ has a CMC value that is at least one order of magnitude less than the other surfactants. This gives an advantage that it takes less surfactant to generate foam. It is believed that other dual tail surfactants according to the formula discussed herein will have similar properties.

In the foregoing Detailed Description, various features are grouped together in exemplary embodiments for the purpose of streamlining the disclosure. This method of disclosure is not to be interpreted as reflecting an intention that any claim requires more features than are expressly recited in the claim. Rather, as the claims reflect, inventive subject matter lies in less than all features of a single disclosed embodiment. Thus, the claims are hereby incorporated into the Detailed Description, with each claim standing on its own as a separate embodiment of the disclosure.

What is claimed is:

1. A method for recovering petroleum from a subterranean formation that is penetrated by at least one injection well and one production well, comprising:

injecting a dispersion composition of carbon dioxide and water in the subterranean formation with a nonionic surfactant of the Formula:

where $R^1$ and $R^3$ or $R^1$ and $R^2$ are each independently a linear, a branched, a cyclic or an acyclic aliphatic group having 4 to 18 carbon atoms, with a remaining one of $R^1$, $R^2$ or $R^3$ being —$(R^4O)_y$—H where $R^4$ is an aliphatic group having 2 to 4 carbon atoms and y is an integer from 9 to 40 inclusive; and recovering petroleum from the subterranean formation from a production well.

2. The method of claim 1, including allowing the carbon dioxide in the dispersion composition to dissolve into the petroleum in the subterranean formation to provide a lowered viscosity of the petroleum; and recovering the petroleum having the lowered viscosity from the subterranean formation.

3. The method of claim 1, including injecting a drive fluid into the subterranean formation after injection the dispersion composition of carbon dioxide and water in the subterranean formation.

4. The method of claim 1, where the aliphatic group of $R^1$ and $R^3$ or $R^1$ and $R^2$ are each of a different length.

5. The method of claim 1, where y is an integer from 9 to 20 inclusive.

6. The method of claim 1, where $R^4$ is a linear alkyl group 2 carbon atoms.

7. The method of claim 1, where the nonionic surfactant has the Formula:

where y is an integer from 9 to 20 inclusive.

8. The method of claim 1, where a water phase of the dispersion composition formed of carbon dioxide and water further includes at least one additive selected from a group consisting of corrosion inhibitors, co-surfactants, scale inhibitors, and mixtures thereof.

* * * * *